US006386228B2

(12) United States Patent
Conrads et al.

(10) Patent No.: US 6,386,228 B2
(45) Date of Patent: May 14, 2002

(54) PILOT DEVICE FOR A SAFETY VALVE

(75) Inventors: Hermann-Josef Conrads, Herzogenaurach; Erwin Laurer, Möhrendorf; Jürgen Model, Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 70 days.

(21) Appl. No.: 09/729,067

(22) Filed: Dec. 4, 2000

Related U.S. Application Data

(63) Continuation of application No. PCT/DE99/01560, filed on May 27, 1999.

(30) Foreign Application Priority Data

Jun. 2, 1998 (DE) ........................................ 198 24 494

(51) Int. Cl.$^7$ .......................... G05F 16/10; F16K 17/10

(52) U.S. Cl. ........................ 137/492; 137/488; 251/282

(58) Field of Search ................................ 137/488, 492, 137/492.5; 251/282

(56) References Cited

U.S. PATENT DOCUMENTS 4,402,341 A * 9/1983 Reip .......................... 137/489
4,977,925 A * 12/1990 Tiefenthaler ............. 137/489.5

FOREIGN PATENT DOCUMENTS

DE 39 06 888 A1 9/1990
DE 196 28 610 C1 1/1998

* cited by examiner

*Primary Examiner*—Stephen M. Hepperle
*Assistant Examiner*—Ramesh Krishnamurthy
(74) *Attorney, Agent, or Firm*—Laurence A. Greenberg; Werner H. Stemer; Ralph E. Locher

(57) ABSTRACT

A control device includes a pressure-displacement transducer for triggering a control part for activating a safety valve of a pressure vessel. A space in the pressure-displacement transducer can be connected to a blow-off tank through a drainage line. A first embodiment includes a switchover valve device which is associated with the drainage line and connects the space to a take-off line instead of to the blow-off tank when the pressure in the blow-off tank is above a limiting pressure. A second embodiment includes a hydraulic compensating system which exerts a first force on the pressure-displacement transducer, from a pressure in the blow-off tank. That force counteracts a second force produced in the space by that pressure and in particular compensates for that force.

22 Claims, 5 Drawing Sheets

PILOT DEVICE FOR A SAFETY VALVE

CROSS-REFERENCE TO RELATED APPLICATION

This application is a continuation of copending International Application No. PCT/DE99/01560, filed May 27, 1999, which designated the United States.

BACKGROUND OF THE INVENTION

Field of the Invention

The invention relates to a pilot device including a pressure-displacement transducer in which a difference in pressure between a pressurized space and another space separated therefrom can be converted into a movement of an adjusting body, a pilot part to be triggered by the adjusting body for activating a safety valve of a pressure vessel, a pressure-removal line for connecting the pressure vessel to the pressurized space, and a drainage line for connecting the other space to a blow-off tank.

German Published, Non-Prosecuted Patent Application DE 39 06 888 A1 and German Patent DE 196 28 610 C1 disclose pilot devices for activating a safety valve. The pilot devices in those cases are spring-loaded pilot valves, i.e. pilot valves which operate in accordance with the closed circuit principle. They have a valve spring which acts counter to a hydraulic force derived from a system pressure of a system which is to be protected, for example a pressure vessel. Pilot valves of that type are therefore actuated solely by the system pressure which means that external energy does not necessarily have to be supplied by motor-driven, magnetic, pneumatic or hydraulic devices, for example.

At least three lines emerge from a pilot valve in the above-mentioned publications: a first line is a pressure-removal line (measuring line) through the use of which the pilot valve can be acted upon by the system pressure in the pressure vessel. A second line is a control line through which the pilot valve acts upon the safety valve. For example, in order to open a safety valve operating in accordance with the discharging principle, the safety valve is discharged through the control line. A third line is a drainage line (blow-out line) which either leads into the atmosphere or opens into a blow-off tank (pressure-maintaining blow-off tank), especially in the case of nuclear power plants. For example, a safety valve operating in accordance with the discharging principle is discharged into the blow-off tank through the control line and the drainage line.

In order to actuate, i.e. to trigger, the above-mentioned pilot devices, a pressure-displacement transducer is provided in which a difference in pressure between a pressurized space and another space separated therefrom can be converted into a movement of an adjusting body. The pressure-removal line opens into the pressurized space. The pressure-displacement transducer of German Published, Non-Prosecuted Patent Application DE 39 06 888 A1 has a transducer piston which is guided in a cylinder and can be acted upon by the pressure in the pressurized space. The pressure-displacement transducer of German Patent 196 28 610 C1 is equipped with a transducer bellows having an interior which forms the pressurized space. In both cases, the difference in pressure between the pressurized space and the other space in the pressure-displacement transducer is converted into a movement of the adjusting body. The adjusting body is formed, in particular, by the transducer piston or by a bellows head of the transducer bellows. The adjusting body acts through a tappet on a pilot part which, for example, triggers the discharging of a safety valve operating in accordance with the discharging principle. The pilot part of German Patent DE 196 28 610 C1 includes a "prepilot part" and a "pilot part"acting directly on the safety valve.

In cases in which the other space is connected to the drainage line opening into the blow-off tank, the above-mentioned pilot valves are disadvantageously sensitive to a rise in pressure in that blow-off tank. A short-lived but strong rise in pressure could, for example, be produced in that tank if, in the event of a fault, the pressure in the blow-off tank exceeds the design value, thereby causing a bursting membrane serving to protect the pressure of the blow-off tank to break. A rise in pressure of that type could lead to an undesired, premature closing of an open, i.e. blowing-off, safety valve. However, even a relatively small rise in pressure in the blow-off tank can have disadvantageous effects on the functioning of the pilot valve. That is because, as a result, the response pressure for opening the activated safety valve can be markedly changed through the drainage line. A rather small rise in pressure of that type in the blow-off tank can be caused, for example, by the blowing-off of a safety valve if the blowing-off takes places through a blow-off line into the blow-off tank, as is customary in nuclear power plants. Even a safety valve blowing off at that time could therefore disadvantageously change the response pressure of another safety valve which is still closed.

SUMMARY OF THE INVENTION

It is accordingly an object of the invention to provide a pilot device for a safety valve, which overcomes the hereinafore-mentioned disadvantages of the heretofore-known devices of this general type, which is insensitive to a rise in pressure in a blow-off tank and in which, in particular, an undesired closing of an open safety valve or an effect on a response pressure for opening a safety valve through the use of a rise in pressure in the blow-off tank, is reliably avoided.

With the foregoing and other objects in view there is provided, in accordance with the invention, a pilot device, comprising a pressure-displacement transducer having a pressurized space, another space separate from the pressurized space, and an adjusting body, for converting a difference in pressure between the pressurized space and the other space into a movement of the adjusting body; a pilot part to be triggered by the adjusting body for activating a a safety valve of a pressure vessel; a pressure-removal line for connecting the pressure vessel to the pressurized space; a blow-off tank; a drainage line for connecting the other space to the blow-off tank; and a switchcover valve device associated with the drainage line and having an outgoing take-off line, the switchcover valve device connecting the other space to the take-off line instead of to the blow-off tank when a pressure in the blow-off tank is above a limiting pressure.

In the case of this pilot device according to the invention, an excessive pressure in the blow-off tank is kept away from the pressure-displacement transducer. It is ensured at the same time that fluid can flow out of the other space through the take-off line. The take-off line can open, for example, into a nuclear power plant draining system which is always unpressurized.

The switchover valve device can, for example, be disposed at least partially in the drainage line. The take-off line can branch off from the drainage line through the switchover valve device.

In accordance with another feature of the invention, the switchover valve device includes a drainage valve device which is disposed in the drainage line and a take-off valve device which is disposed in the take-off line.

In accordance with a further feature of the invention, the drainage valve device and/or the take-off valve device is/are closed in a starting position of the adjusting body in which the pilot part is not triggered. This ensures that the other space is isolated from the blow-off tank during normal operation. Normal operation means that the safety valve is closed, i.e. that in the case of a safety valve operating in accordance with the discharging principle, no fluid flow (drainage) can be taken off out of the pilot device.

In accordance with an added feature of the invention, the closing force of the drainage valve device is smaller than a closing force of the take-off valve device.

During implementation of the discharging principle, fluid (drainage) flowing out of the pilot part, when the pilot part is triggered, passes through the drainage line to the switchcover valve device. As a result, the pressure at the drainage valve devices rises, the drainage valve device opens and the fluid can be blown out into the blow-off tank through the drainage line. After a rise in pressure in the blow-off tank, it is not possible to open the drainage valve device or else the drainage valve device closes again because of this rise in pressure. In this case, the take-off valve device opens after the pressure upstream of the switchcover valve device has risen slightly further because of the further flowing out of fluid. The fluid can then be blown out through the take-off line.

With the objects of the invention in view, there is also provided a pilot device, comprising a pressure-displacement transducer having a pressurized space, another space separate from the pressurized space, and an adjusting body, for converting a difference in pressure between the pressurized space and the other space into a movement of the adjusting body; a pilot part to be triggered by the adjusting body for activating a safety valve of a pressure vessel; a pressure-removal line for connecting the pressure vessel to the pressurized space; a blow-off tank having a given pressure; a drainage line for connecting the other space to the blow-off tank; a compensating line; and a hydraulic compensating system to be connected to the blow-off tank through the compensating line, the hydraulic compensating system producing a first force on the adjusting body from the given pressure, and the first force counteracting a second force on the adjusting body produced in the other space by the given pressure.

As a result, the undesirable second force does not have an effect, or at least does not have a severe and undesirable effect, on the pressure-displacement transducer. In contrast to the first embodiment, the second embodiment affords the additional advantage that an active flowing-out of fluid (drainage) into a space outside the blow-off tank does not occur.

With regard to both embodiments according to the invention, a pressure-displacement transducer is understood to be any system in which a change in pressure, in particular a rise in pressure, can be converted into a positional change of an adjusting body. That occurs irrespective of whether the positional change takes place continuously with increasing pressure or abruptly at a certain limiting pressure.

The safety valve of one of the two embodiments can operate in particular in accordance with the discharging or loading principle. Activation through the use of the pilot part leads to discharging or loading and therefore to the opening of the safety valve.

In accordance with another feature of the invention, the adjusting body in one of the two embodiments is connected to a transducer piston and/or to a first transducer bellows, which piston and/or bellows can be acted upon by the pressure in the other space and can be used to produce the second force.

In accordance with a further feature of the second embodiment of the invention, the hydraulic compensating system includes a compensating piston and/or a compensating bellows which can be acted upon by the pressure in the blow-off tank, and which can be used to produce the first force. The first force can, in particular, be transmitted mechanically from the compensating piston or from the compensating bellows to the adjusting body.

In accordance with an added feature of the invention, the diameter of the compensating piston and/or of the compensating bellows essentially corresponds to the diameter of the transducer piston and/or of the first transducer bellows. In the case of a refinement of this type, a rise in pressure in the blow-off tank has virtually no effect on the functioning of the pressure-displacement transducer. As in the case of a pilot device without a hydraulic compensating system, an increased pressure in the blow-off tank produces the undesirable second force on the adjusting body. However, since the other space is connected to the blow-off tank through the drainage line, this pressure at the same time also acts on the compensating piston or the compensating bellows and thereby produces the first force on the adjusting body. That force compensates for the undesirable second force.

In accordance with an additional feature of the invention, the compensating piston and the compensating bellows are disposed in such a way that they can move along an axis along which the adjusting body can also be moved. This ensures that the first force which is produced at the compensating piston and the compensating bellows can be transmitted in a simple and reliable manner to the adjusting body.

In accordance with yet another feature of the invention, the compensating piston and the compensating bellows are disposed in series with the adjusting body. Such a configuration one behind another in a straight line has the advantage of permitting the hydraulic compensating system to be retrofitted simply and rapidly onto an existing pilot device which does not have a hydraulic compensating system.

In accordance with yet a further very particularly preferred feature of the invention, the compensating piston or the compensation bellows is disposed in such a way that it at least partially surrounds the transducer piston or the first transducer bellows or a second transducer bellows. This enables the hydraulic compensating system to be integrated in a particularly space-saving and compact manner in the control device for the safety valve.

In accordance with yet an added feature of the invention, the compensating piston or compensating bellows has an undergrip-like driver for the transducer piston or for one of the transducer bellows.

In accordance with yet an additional feature of the invention, the drainage line and/or the compensating line is laid on a slope, as seen from the hydraulic compensating system. This provides the advantage of enabling pressure medium, for example condensate, which has penetrated to flow out of the control device again, in particular after the buildup of pressure has finished.

In accordance with a concomitant feature of the invention, the first force is transmitted, for example through the use of the driver, to the transducer piston or to one of the transducer bellows and is transmitted to the separate adjusting body, if the piston or bellows do not themselves form the adjusting body.

Other features which are considered as characteristic for the invention are set forth in the appended claims.

Although the invention is illustrated and described herein as embodied in a pilot device for a safety valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
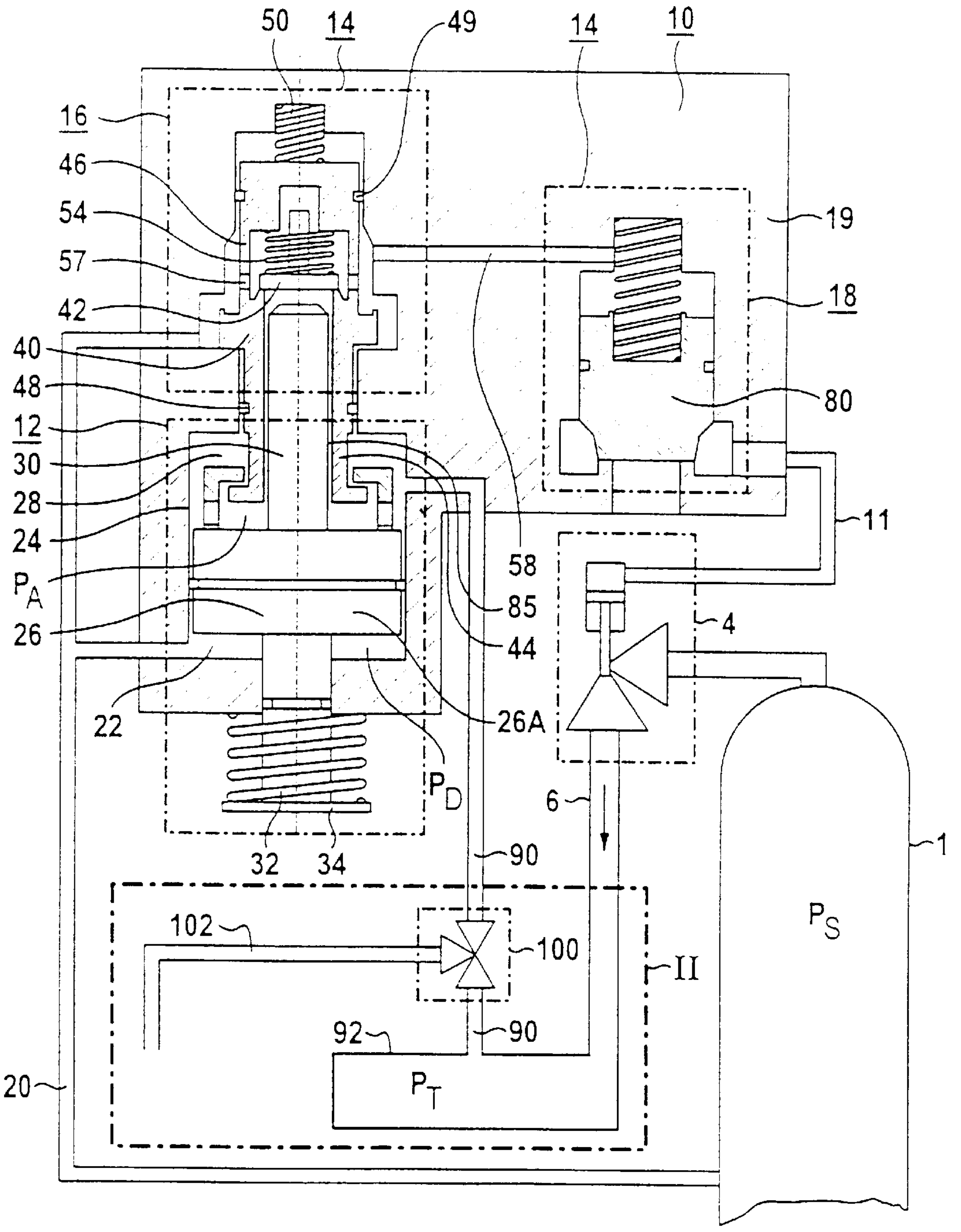
FIG. 1 is a fragmentary, diagrammatic, sectional view of a first exemplary embodiment of a control device according to the invention in a first embodiment form.

Referring now to the figures of the drawings in detail and first, particularly, to FIG. 1 thereof, there is seen a system to be protected which is a pressure vessel 1 that is assigned a safety valve 4. The safety valve 4 operates in accordance with the discharging principle and discharges the pressure vessel 1 through a blow-off line 6 when a system pressure $p_S$ rises above a previously set limiting value. The pressure vessel 1 is, for example, a pressure vessel of a nuclear reactor.

In particular, the opening of the safety valve 4 is controlled through the use of a pilot device which is denoted overall by reference numeral 10 and which acts on the safety valve 4 through a control line 11. The pilot device 10 is based on the principle of a spring-loaded pilot valve in accordance with the closed circuit principle and includes three subassemblies. The subassemblies are a pressure-displacement transducer 12 and a pilot part 14 which, for its part, is formed of a prepilot part 16 and a main pilot part 18. The three subassemblies are accommodated in a common housing 19.

The pressure vessel 1 is connected through a pressure-removal line 20 to a pressurized space 22 of the pressure-displacement transducer 12. The pressurized space 22 is part of a cylinder 24 in which an adjusting body 26, in this case a transducer piston 26A, can be moved. The transducer piston 26A separates the pressurized space 22 from another space 28. The adjusting body 26 acts on the prepilot part 16 through a tappet 30. The adjusting body 26 or the transducer piston 26A is pressed downward in FIG. 1 through the use of a first spring 32 which rests on a plate 34. FIG. 1 shows the adjusting body 26 in a starting position in which the pilot part 14 is not triggered. As the system pressure $p_S$ in the pressure vessel 1 rises, a pressure $p_D$ in the pressurized space 22 also rises. The pressure $p_D$ is converted into a movement of the adjusting body 26 and of the tappet 30 until finally the movement has been advanced to a sufficient extent that the pilot part 14 is triggered in a non-illustrated triggering position.

The prepilot part 16 has a refilling cone 40 and a discharging cone 42. The refilling cone 40 is guided in a cylinder in the housing 19 through a lower extension 44, an upper extension 46 and sealing elements 48, 49.

The refilling cone 40 is pressed downward in FIG. 1 through the use of a second spring 50. The discharging cone 42, which is situated in the interior of the refilling cone 40, is likewise pressed downward by a third spring 54, with regard to FIG. 1.

A detailed description of the object, construction and functioning of the refilling cone 40 and of the discharging cone 42 is given in German Patent DE 196 28 610 C1, column 4, line 19 to column 5, line 8. Therefore, only brief details are given in the following about the discharging cone 42.

When the prepilot part 16 is triggered, the discharging cone 42 is lifted off from its seat through the use of the tappet 30, thereby beginning discharging of the main pilot part 18 and therefore discharging of the safety valve 4 as well. In the process, the discharging acts on a check valve cone 80 of the main pilot part 18, through a discharging bore 57 and a discharging channel 58. Fluid flowing off through the discharging channel 58 during the discharging flows past the discharging cone 42, along an annular space 85 around the tappet 30, into the other space 28 and from there through a drainage line 90 into a blow-off tank 92.

During the discharging of the main pilot part 18 and of the safety valve 4, the refilling cone 40 bears against its (upper) seat in the housing 19 (bearing against a lower stop) as shown in FIG. 1. Therefore, the system pressure in the pressure vessel 1 does not act, or no longer acts, on the main pilot part 18.

The safety valve 4 which is shown in FIG. 1 blows off through the blow-off line 6 into the blow-off tank 92. Further non-illustrated safety valves can also blow off into the blow-off tank 92. As a result, an undesirable rise in pressure can occur in the blow-off tank 92 (pressure $p_T$). That rise in pressure would also have an effect on the other space 28 of the pressure-displacement transducer 12 (pressure $p_A$) and could affect its functioning. In order to avoid that, the pilot device illustrated in FIG. 1 has a switchover valve device 100 from which a take-off line 102 emerges. The switchover valve device 100 interrupts the connection of the other space 28 to the blow-off tank 92 at a pressure $p_T$ in the blow-off tank 92 above a limiting pressure set at the switchover valve device 100. Instead, the switchover valve device 100 produces a connection of the other space 28 to the take-off line 102 which opens into a non-illustrated space that is always unpressurized.

Figure 2:
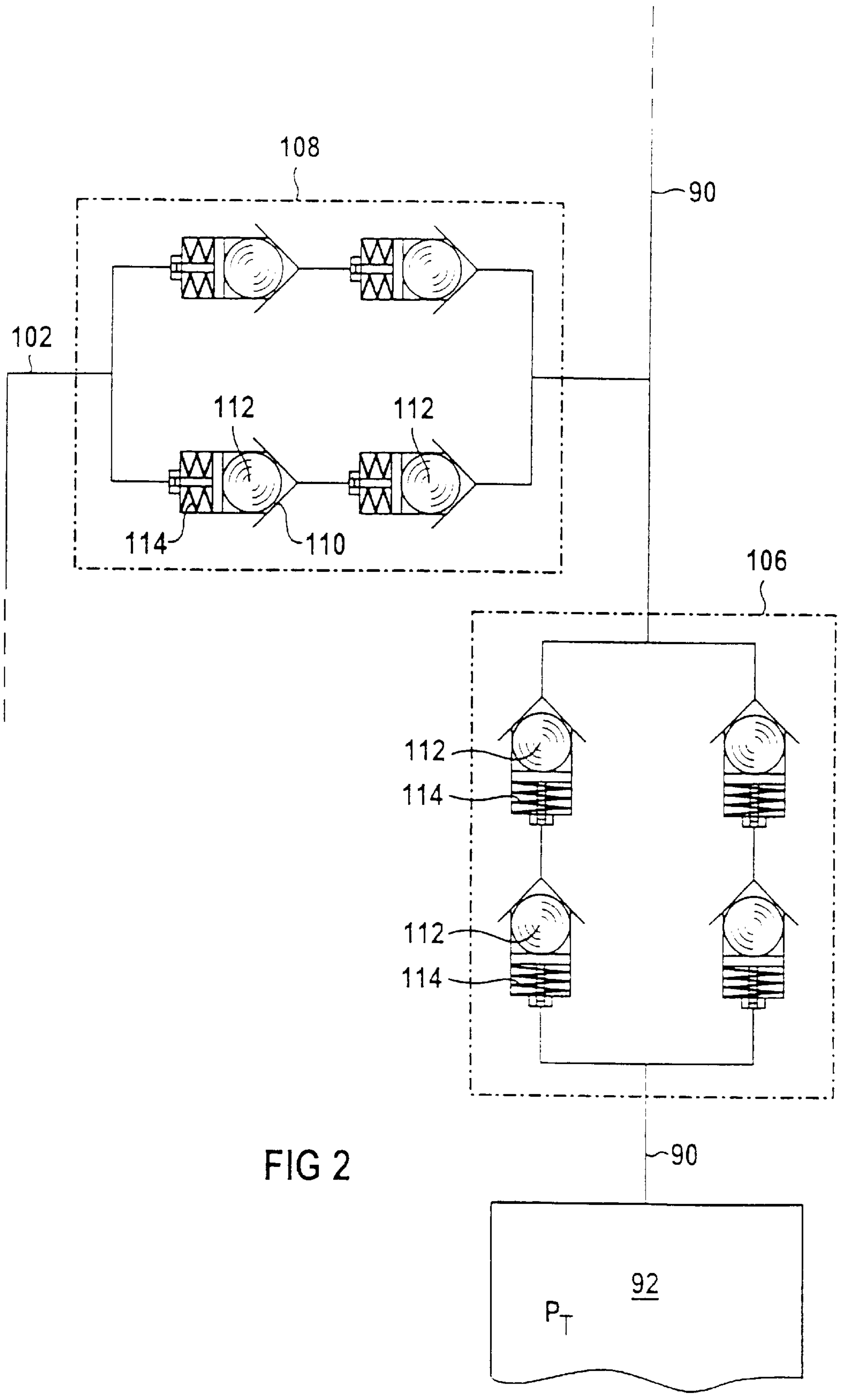
FIG. 2 is an enlarged, fragmentary view of a portion of FIG. 1.

One particular refinement of the switchover valve device 100 is illustrated in detail and on an enlarged scale in FIG. 2. That refinement includes a drainage valve device 106 which is disposed in the drainage line 90 and a take-off valve device 108 which is assigned to the take-off line 102.

The drainage valve device 106 and the take-off valve device 108 each include a parallel connection of two valves connected in series. As a result, a subordinate individual failure of a valve can be controlled both in the open and in the closed position, both of the drainage valve device 106 and of the take-off valve device 108.

These valves are only illustrated diagrammatically in FIG. 2. They have a seat 110 on to which a valve cone 112 is pressed through the use of a spring 114. A closing force of the valves in the take-off valve device 108 is greater than that of the valves in the drainage valve device 106. The pressure $p_T$ in the blow-off tank 92 may rise in an undesirable manner during discharge through the drainage line 90 into the blow-off tank 92. In that case, the valves in the drainage valve device 106 first of all close before, at a slightly higher pressure in the drainage line 90, the valves in the take-off valve device 108 open and enable discharging through the take-off line 102. When the undesirable rise in pressure has gone down again, the connection to the blow-off tank 92 is released again.

Figure 3:
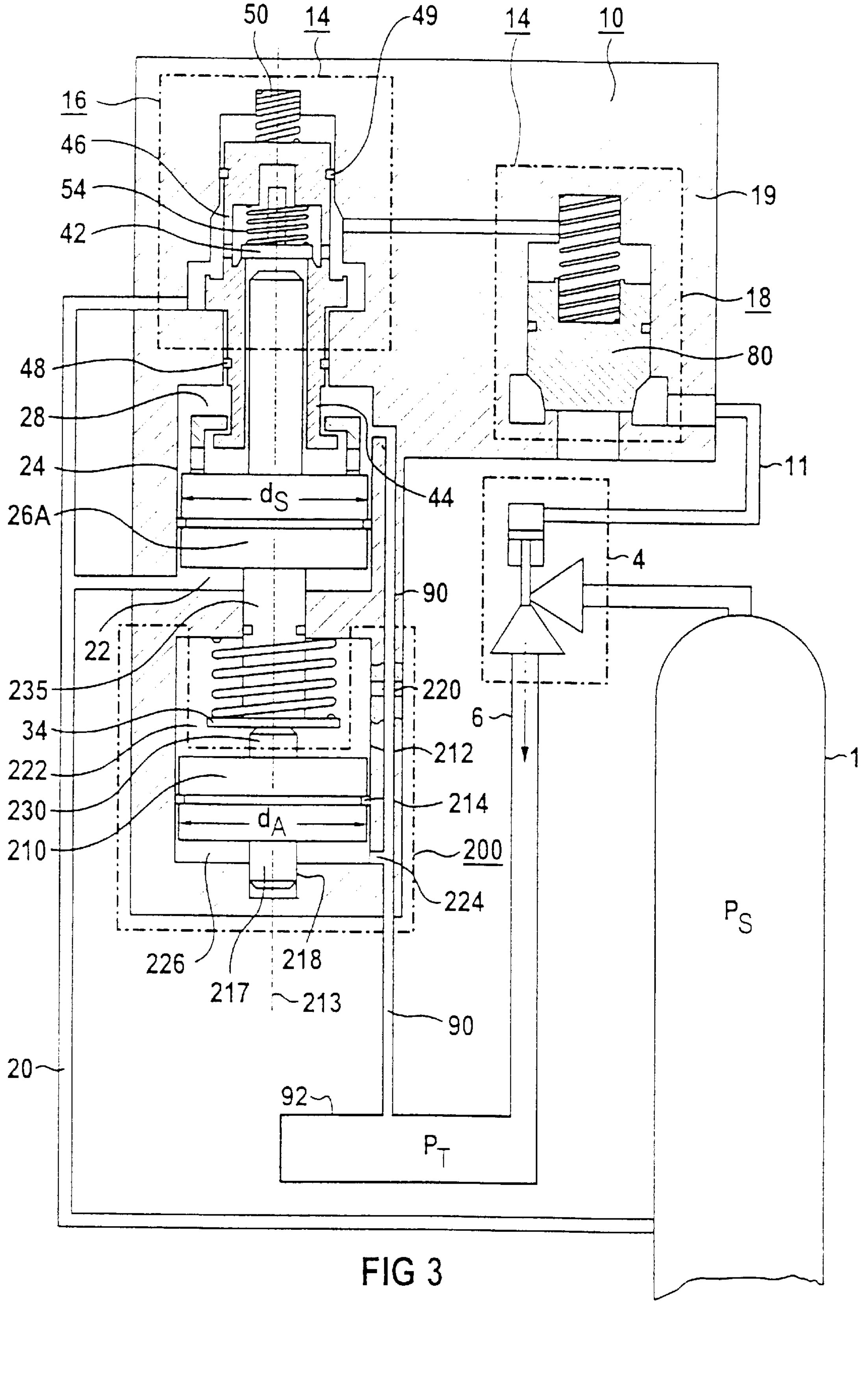
FIG. 3 is a fragmentary, sectional view of a second exemplary embodiment of a pilot device according to the invention in a second embodiment form.

FIG. 3 illustrates a second exemplary embodiment of a pilot device 10 according to the invention. The FIG. 3 embodiment has a hydraulic compensating system 200 for “back pressure compensation” in place of the switchover valve device and is otherwise largely identical with the pilot device 10 of FIG. 1. The compensating system 200 includes a compensating piston 210 which can be moved in a cylinder 212. The compensating piston 210 can be moved symmetrically with regard to an axis 213 and along this axis. The transducer piston 26A can also be moved along the axis 213. The compensating piston 210 is sealed with respect to the cylinder 212 by a sealing ring 214 and is guided through the use of a cylinder body 217 in a guide 218 in the housing 19 of the control device 10. As compared with the exemplary embodiment illustrated in FIG. 1, the housing 19 is extended downward in FIG. 3 beyond the plate 34.

A first bore 220 connects a first chamber 222, which is formed by the compensating piston 210 in the cylinder 212, to a space which is not illustrated and is always unpressurized, for example to a draining system of a nuclear power plant. The first chamber 222 can also be connected to a containment of the nuclear power plant. In any case, it would only be possible for leakage flows from seals or bellows being used to emerge from the first chamber 222.

A compensating line 224, which is constructed as a second bore, connects a second chamber 226, which is likewise formed by the compensating piston 210 in the cylinder 212, to the drainage line 90.

An undesirable rise in pressure in the blow-off tank 92 has the same effect on the second chamber 226 as on the other space 28. The compensating piston 210, which is acted upon through the second chamber 226 by the pressure $p_T$ in the blow-off tank 92, then produces a first force (directed upward in FIG. 3) which is transmitted through a piston continuation 230, the plate 34 and a transducer bolt 235, to the adjusting body 26, i.e. to the transducer piston 26A. A diameter $d_A$ of the compensating piston 210 is essentially the same size as a diameter $d_S$ of the transducer piston 26A (identical cross-sectional area). Therefore, the first force completely compensates for an undesirable second force (directed downward in FIG. 3) which is produced at the transducer piston 26A by the pressure $p_T$ in the blow-off tank 92 through the other space 28. As a result, under the influence of the system pressure $p_S$ in the pressurized space 22 (pressure $p_D \cong p_S$), the movement of the transducer piston 26A is unaffected by the rise in pressure in the blow-off tank 92.

Figure 4:
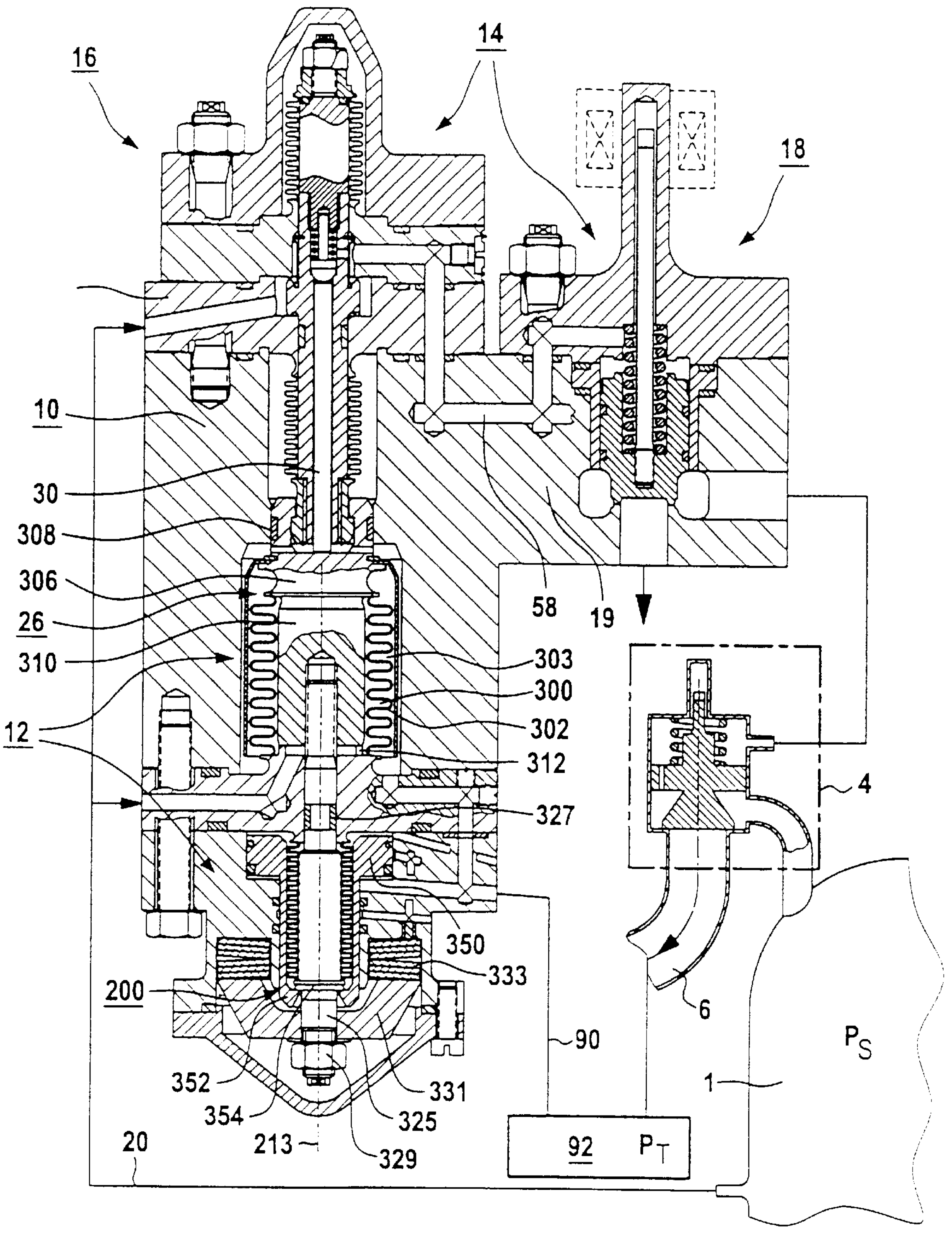
FIG. 4 is a fragmentary, sectional view of a third exemplary embodiment of a pilot device according to the invention in the second embodiment form.

FIG. 4 shows a fourth exemplary embodiment of a pilot device 10 according to the invention. That pilot device likewise includes a hydraulic compensating system 200. The compensating system 200 is drawn on an enlarged scale in FIG. 5. Those parts of the pilot device 10 which do not concern the compensating system 200 have already been described in German Patent DE 196 28 610 C1, column 3, line 29 to column 6, line 57. That section of text from German Patent DE 196 28 610 C1 is part of the present patent application.

Figure 5:
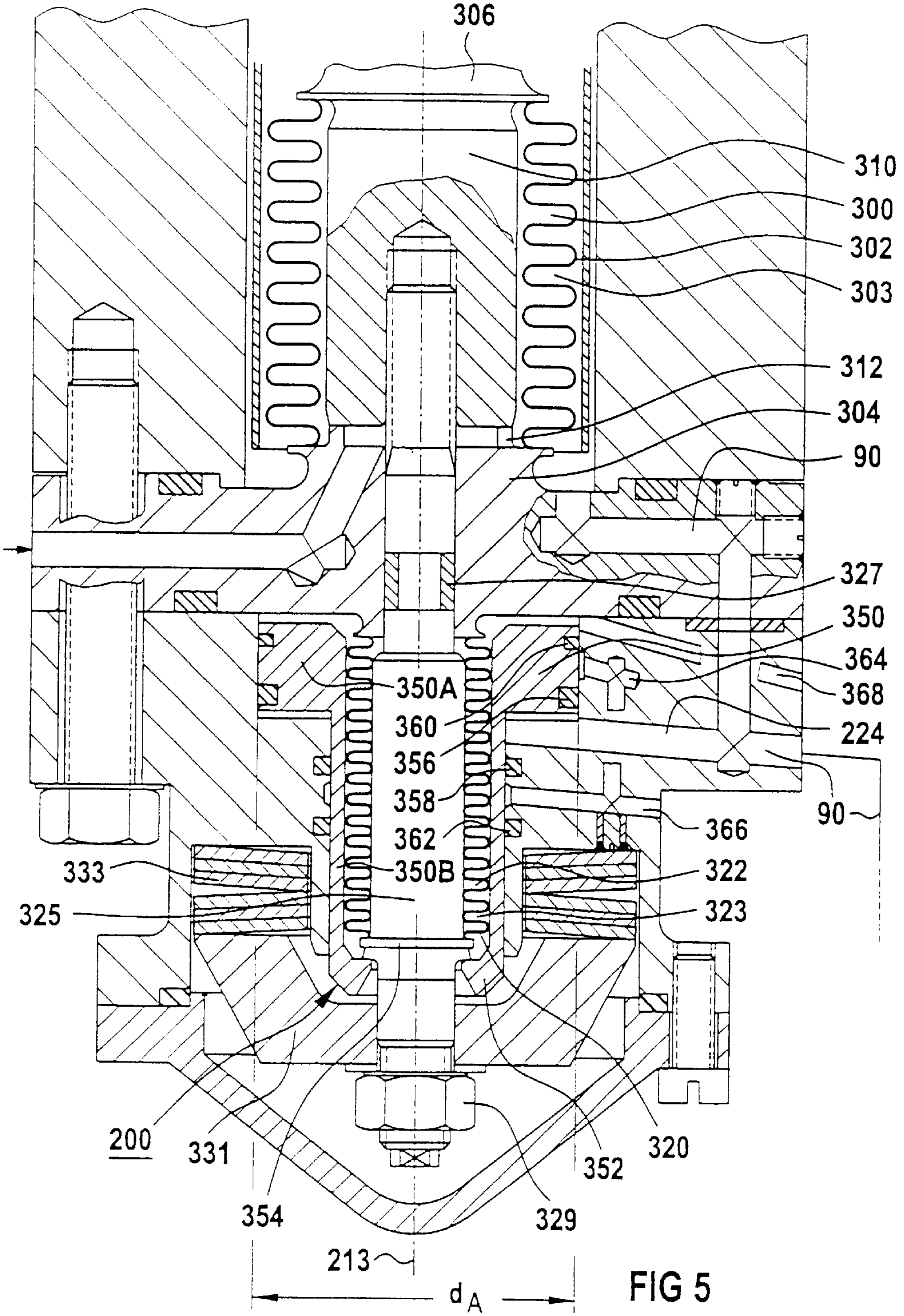
FIG. 5 is an enlarged, fragmentary view of a portion of FIG. 4.

In the case of the pressure-displacement transducer 12 of the exemplary embodiment illustrated in FIGS. 4 and 5, the system pressure $p_S$ of the pressure vessel acts on an interior of first and second transducer bellows 302 and 320.

The interior of the first transducer bellows 302 forms a first pressurized space 300 which is separated from a first other space 303 through the use of the first transducer bellows 302. A lower end of the first transducer bellows 302 is welded to a flange 304. An upper end of the first transducer bellows 302 is connected to a bellows head 306 which essentially forms the adjusting body 26. This bellows head 306 has a guide bearing 308 in its upper section. The bellows head 306 may include a lower, cylindrical part 310 on which the first transducer bellows 302 is guided. When the device is unpressurized, an end surface of this cylindrical part 310 can rest on projections 312 of the flange 304.

The second transducer bellows 320, which is welded onto the flange 304 from below, has an interior that forms a second pressurized space 322. The second transducer bellows 320 separates the second pressurized space 322 from a second other space 323. The second transducer bellows 320 has an opposite, lower end which is welded to a screw-in part 325 that is connected to a lower end of the cylindrical part 310 of the bellows head 306. This connection may be provided by a thread. The screw-in part 325 has a guide bearing 327 toward the flange 304. A lower end of the screw-in part 325 is provided with a thread through which a prestressing force can be applied to a spring 333 through the use of a nut 329 and a thrust piece 331. The spring 333 is supported on the flange 304. The spring 333 is prestressed and forms a counterforce to a hydraulic force which acts on the first transducer bellows 302 through the medium from the pressure-removal line 20. The hydraulic force on the second transducer bellows 320 acts in the same direction as the force of the spring 333. The hydraulic force on the first transducer bellows 302, on one hand, and the sum of the hydraulic force on the second transducer bellows 320 and the spring force of the spring 333, on the other hand, maintain an equilibrium at an unchanged pressure in the pressure vessel 1.

In the exemplary embodiment illustrated in FIGS. 4 and 5, the hydraulic compensating system 200 includes a compensating annular piston 350 which is disposed in such a way that it surrounds the second transducer bellows 320.

In the example shown in FIGS. 4 and 5, the compensating annular piston 350 has a narrow part 350B in a lower region and a wide part 350A in an upper region.

The compensating annular piston 350 acts on an expanded portion 354 on the screw-in part 325 through an undergrip-like driver 352 on the narrow part 350B. The compensating annular piston 350 is illustrated in section on an enlarged scale in FIG. 5. The compensating annular piston 350 is connected to the drainage line 90 through a compensating line 224, which is configured as a bore. A diameter $d_A$ of the wide part 350A of the compensating annular piston corresponds to the hydraulic diameter of the first transducer bellows 302 (taking into account the larger wetted surface of a bellows as compared with a piston of the same diameter). Since both the compensating annular piston 350 and the first transducer bellows 302 are acted upon by a possibly increased pressure in the drainage line 90, a compensation of force is brought about in the pressure-displacement transducer. This is because the undergrip-like driver 352 comes to rest during the above-mentioned rise in pressure against the flange-like expanded portion 354 and transmits a hydraulic first force, which is produced in the compensating annular piston 350, as a compensation force to the bellows head 306 which forms the adjusting body. An undesirable second force which is produced by the pressure in the first other space 303 also acts on the bellows head 306 in the opposite direction. As a result, a change to the response pressure of the pilot device 10 because of a rise in pressure in the drainage line 90 and/or in the blow-off tank 92, is equally unlikely as a switching back of the control device 10, which has been switched over into the triggering state, that is associated with an undesired closing of the open safety valve 4.

That part of the compensating annular piston 350 which is acted upon by the pressure from the drainage line 90 is sealed off from the remaining part of the pressure-displacement transducer 12 through the use of sealing elements 356, 358, 360 and 362. The sealing elements are disposed in pairs as a double seal 356, 360 and 358, 362. A space which is located between two sealing elements disposed as a double seal, i.e., for example, a space between the sealing element 356 and the sealing element 360, is connected through respective bores 364 and 366 to a non-illustrated space which is always unpressurized and in particular it is connected to a draining system of a nuclear power plant. The remaining part of the pressure-displacement transducer 12 is connected through a line 368 to the atmosphere or to the containment of the nuclear power plant.

The drainage line 90, the compensating line 224 and the bores 364, 366 mentioned in the last paragraph have a downwardly directed inclination or slope, as viewed from the interior of the pilot device 10 or pointing away from the latter, so that pressure medium, in particular condensate, which has penetrated can flow off again.

We claim:

1. In a system having a pressure vessel and a safety valve for the pressure vessel, a control device, comprising:

a pressure-displacement transducer having a pressurized space, another space separate from said pressurized space, and an adjusting body, for converting a difference in pressure between said pressurized space and said other space into a movement of said adjusting body;

a pilot part to be triggered by said adjusting body for activating the safety valve of the pressure vessel;

a pressure-removal line for connecting the pressure vessel to said pressurized space;

a blow-off tank having a given pressure;

a drainage line for connecting said other space to said blow-off tank;

a compensating line; and a hydraulic compensating system to be connected to said blow-off tank through said compensating line, said hydraulic compensating system producing a first force on said adjusting body from said given pressure, and said first force counteracting a second force on said adjusting body produced in said other space by said given pressure.

2. The pilot device according to claim 1, including a transducer piston connected to said adjusting body, said transducer piston to be acted upon by pressure in said other space for producing said second force.

3. The pilot device according to claim 1, including a transducer bellows connected to said adjusting body, said transducer bellows to be acted upon by pressure in said other space for producing said second force.

4. The pilot device according to claim 1, including a transducer piston and a transducer bellows connected to said adjusting body, said transducer piston and said transducer bellows to be acted upon by pressure in said other space for producing said second force.

5. The pilot device according to claim 2, wherein said hydraulic compensating system has a compensating piston to be acted upon by said given pressure for producing said first force.

6. The pilot device according to claim 3, wherein said hydraulic compensating system has a compensating bellows to be acted upon by said given pressure for producing said first force.

7. The pilot device according to claim 4, wherein said hydraulic compensating system has a compensating piston and a compensating bellows to be acted upon by said given pressure for producing said first force.

8. The pilot device according to claim 5, wherein a diameter of said compensating piston substantially corresponds to a diameter of said transducer piston and/or of said transducer bellows.

9. The pilot device according to claim 6, wherein a diameter of said compensating piston substantially corresponds to a diameter of said transducer bellows.

10. The pilot device according to claim 7, wherein a diameter of said compensating piston and a diameter of said compensating bellows substantially correspond to a diameter of said transducer piston and a diameter of said transducer bellows.

11. The pilot device according to claim 10, wherein said compensating piston and said compensating bellows are movable along an axis along which said adjusting body is also movable.

12. The pilot device according to claim 5, wherein said compensating piston is disposed in series with said adjusting body.

13. The pilot device according to claim 6, wherein said compensating bellows is disposed in series with said adjusting body.

14. The pilot device according to claim 7, including another transducer bellows, said transducer bellows being first and second transducer bellows, and said compensating piston at least partially surrounding said transducer piston.

15. The pilot device according to claim 7, including another transducer bellows, said transducer bellows being first and second transducer bellows, and said compensating piston at least partially surrounding one of said first and second transducer bellows.

16. The pilot device according to claim 7, including another transducer bellows, said transducer bellows being first and second transducer bellows, and said compensating bellows at least partially surrounding said transducer piston.

17. The pilot device according to claim 7, including another transducer bellows, said transducer bellows being first and second transducer bellows, and said compensating bellows at least partially surrounding one of said first and second transducer bellows.

18. The pilot device according to claim 14, wherein said compensating piston had an undergrip-like driver for said transducer piston.

19. The pilot device according to claim 15, wherein said compensating piston has an undergrip-like driver for one of said transducer bellows.

20. The pilot device according to claim 16, wherein said compensating bellows has an undergrip-like driver for said transducer piston.

21. The pilot device according to claim 17, wherein said compensating bellows has an undergrip-like driver for one of said transducer bellows.

22. The pilot device according to claim 1, wherein at least one of said drainage line and said compensating line is laid on a slope, as seen from said hydraulic compensating system.

* * * * *